NONDESTRUCTIVE READOUT OF THIN FILM MEMORY

Filed Oct. 18, 1961 2 Sheets-Sheet 1

T. E. HASTY &
H. D. TOOMBS
INVENTORS

BY John G. Graham

T. E. HASTY &
H. D. TOOMBS
INVENTORS
BY John G. Graham

United States Patent Office 3,286,241

Patented Nov. 15, 1966

3,286,241

NONDESTRUCTIVE READOUT OF THIN FILM MEMORY

Turner E. Hasty, Dallas, and Harold D. Toombs, Richardson, Tex., assignors to Texas Instruments Incorporated, Dallas, Tex., a corporation of Delaware Filed Oct. 18, 1961, Ser. No. 145,803

9 Claims. (Cl. 340—174)

This invention relates to techniques and apparatus for sensing information stored in ferromagnetic thin film memory devices.

A thin film of ferromagnetic material provides a means for storing binary information due to the fact that uniaxial anisotropy is exhibited by the film. Thin film memory devices are widely used, but ordinarily the information stored in the memory is read out by applying a pulsed magnetic field in a direction parallel to the easy axis of the film and sensing whether or not the magnetization vector switches in direction. However, this type of readout is destructive since the pulsed magnetic field must be greater than the value necessary to switch the magnetization vector. After readout, all of the memory bits will be in the same condition, and so the originally stored information is lost unless re-entered.

It is the principal object of the present invention to provide a technique for nondestructive readout of ferromagnetic thin film memory devices. Another object is to provide means for detecting the direction of the magnetization vector in a thin film which exhibits uniaxial anisotropy. A further object is to provide a random-access, word-organized, multi-bit memory system utilizing ferromagnetic thin film devices and having non-destructive readout.

In accordance with this invention, nondestructive readout of thin film devices is provided by orienting a ferromagnetic thin film memory element, exhibiting uniaxial anisotropy, in an electromagnetic field of a frequency approximately that of the frequency of maximum permeability of the film. An external magnetic field is applied generally parallel or at a particular angle to the easy axis of the film, this field bring of a magnitude less than that necessary to switch the magnetization vector of the film. The influence of the external magnetic field on the permeability of the thin film may be detected to provide readout. This detection can be accomplished by measuring the amplitude of the high frequency field in the region of the thin film device both before and after the external magnetic field is applied.

The novel features believed characteristic of this invention are set forth in the appended claims. The invention itself, however, along with further objects and advantages thereof, may best be understood by reference to the following detailed description of particular embodiments, when read in conjunction with the accompanying drawing, wherein:

Figure 4:
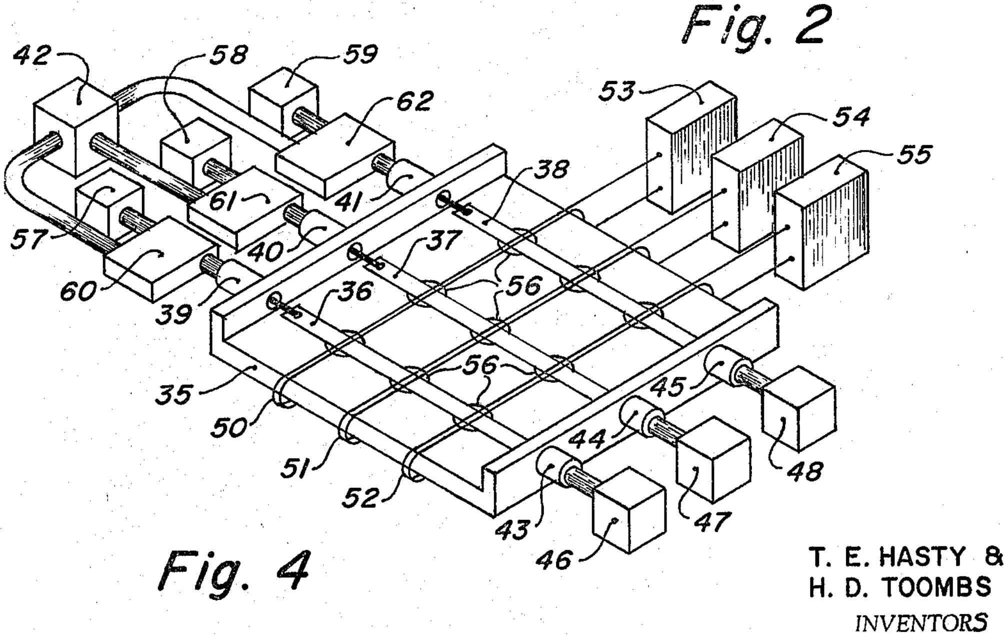
FIGURE 4 is a pictorial representation of a multi-bit memory incorporating the readout principles of this invention and providing a selective write-in arrangement.
Figures 5, 7:
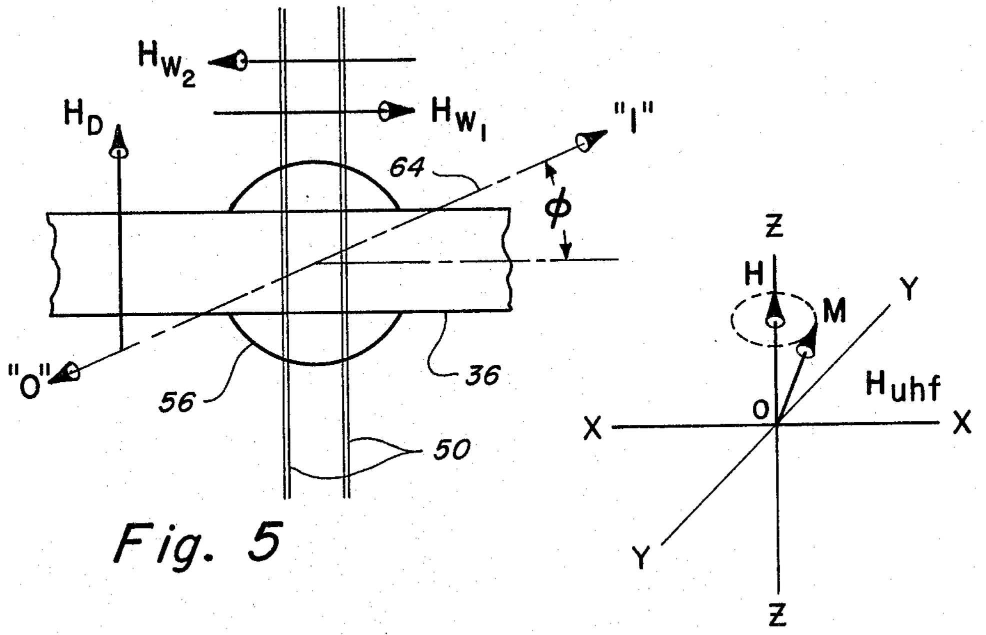
FIGURE 5 is an enlarged view of one of the memory bits of FIGURE 4.
Figure 6:
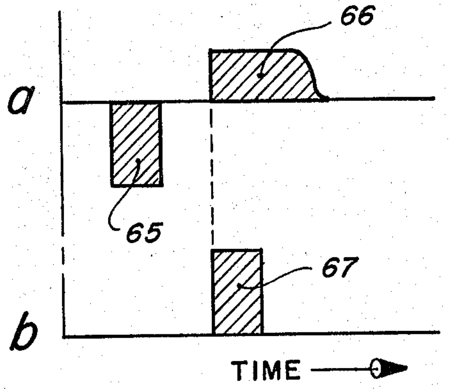
Figure 8:
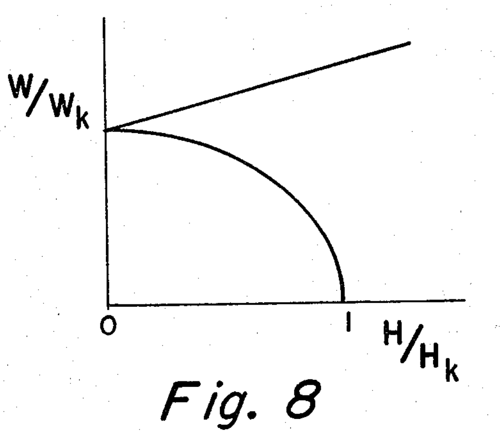

FIGURES 6*a* and 6*b* are graphic representations of voltage waveforms appearing in the apparatus of FIGURES 4 or 5;

FIGURE 7 is a graphic representation of magnetic vectors present in a thin film device; and FIGURE 8 is a graphic representation of the Larmor precession frequency of a thin film device as a function of applied external field.

Figure 1:
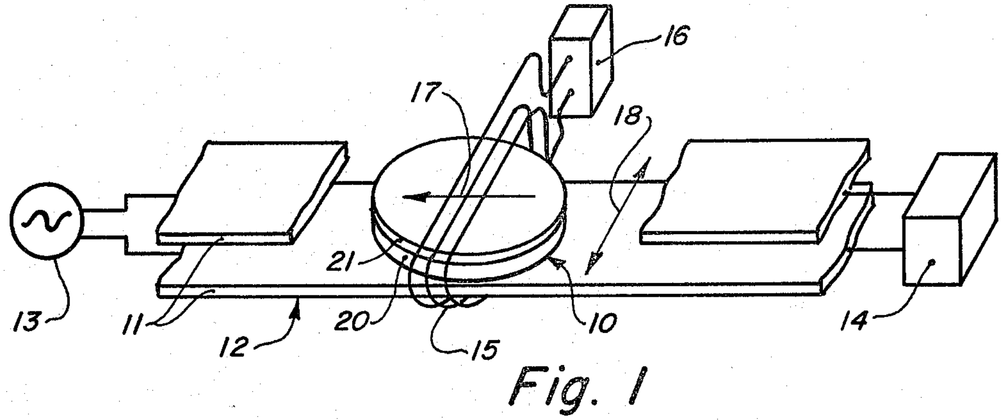
FIGURE 1 is a pictorial representation of apparatus for providing nondestructive readout of a thin film device in accordance with this invention.

With reference to FIGURE 1, there is shown a readout arrangement for a one bit memory comprising a thin film device in the form of a disc 10. The magnetic thin film memory disc 10 is positioned between a pair of parallel plates 11 which comprise a strip line UHF transmission line 12, part of the top plate being broken away to show the disc 10. A signal source 13 having a frequency of about 500 mc., for example, is connected across one end of the transmission line 12 or between the conductive plates 11. The signal injected at the left-hand end by the source 13 will travel down the line 12 past the memory disc 10 and will be sensed by a suitable detecting device 14 which may comprise a microwave crystal diode detector. A readout winding 15, shown external of the plates 11, surrounds the disc 10 and is excited by a readout pulse generator 16. The pulse generator 16 is adapted to produce an output pulse at the time when it is desired to read out the bit stored in the disc 10. This pulse provides a magnetic field in a direction generally parallel to the plane of the disc and parallel to the axis of the transmission line 12 or the plates 11, this magnetic vector being indicated by an arrow 17. The RF energy traveling along the line 12 will have a magnetic vector in a direction perpendicular to the axis of the line and in a plane parallel to the disc 10 as indicated by an arrow 18.

The memory disc 10 comprises a base member such as glass plate 20 having a thin film of ferromagnetic material 21 deposited upon one surface thereof. The thin film 21 may be composed of permalloy, which is a nickel-iron alloy containing approximately 82% nickel and 18% iron, and preferably is about 2000 A. thick. The thin film 21 may be deposited by a conventional evaporation technique, and the degree of uniaxial anisotropy exhibited by the film may be enhanced by a treatment such as annealing. This film 21 will exhibit an easy axis which should be aligned generally parallel or at a certain acute angle with the axis of the transmission line 12 or with the field provided by the winding 15 which is indicated by the arrow 17.

The capability of the thin film device 10 as a memory depends upon the existence of a uniaxial anisotropy in the plane of the film, meaning that the magnetization vector lies in the plane of the film and parallel to a given axis, usually known as the easy axis. The magnetization vector can exist in only two stable positions, one being arbitrarily designated the zero direction and the other designated the one direction, providing a binary memory. A bit of information is stored in the thin film device 10 by applying an external magnetic field in a direction parallel to the easy axis and of a magnitude sufficient to ensure that the magnetization vector is switched to the desired direction.

Figure 3:
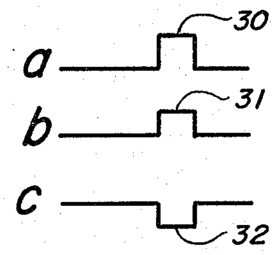
FIGURE 3 is a graphic representation of voltage waveforms appearing in the apparatus of FIGURE 1.
Figure 2:
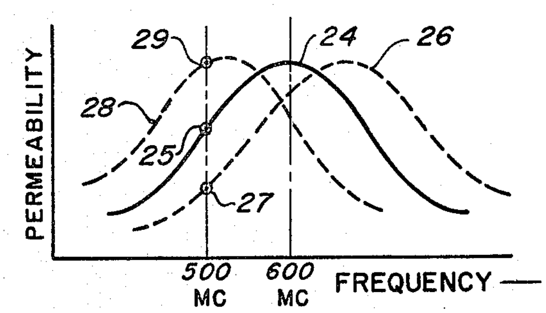
FIGURE 2 is a graphic representation of permeability versus frequency for a thin film utilizing the device of FIGURE 1.

The nondestructive readout provided by this invention is based upon the ability to sense the stored bit of information by detecting the change in the UHF permeability of the thin film caused by application of an external field by the winding 15. As will be hereinafter established, the permeability of a ferromagnetic thin film has a maximum value for a particular frequency. In the presence of no external field, the value of this frequency will depend upon the value of the saturation magnetization and anisotropy field of the film. For the above-described embodiment of the film, the frequency of maximum permeability has been found to be about 600 mc. A graph of permeability versus frequency for a particular thin film is illustrated in FIGURE 2 wherein a line 24 represents the magnitude of permeability exhibited by the thin film device 10 as a function of applied frequency. The line 24 is seen to be centered about a frequency of 600 mc. as explained above. The device 10, however, is excited by a UHF field of a frequency of 500 mc., for example, so that the permeability of the device 10 as it appears in the transmission line 12 will be of a value represented by a point 25 on the line 24 where it intersects the 500 mc. line. Since the frequency of maximum permeability for a thin film is dependent upon the magnetization of the film itself and upon applied magnetic field, this frequency will shift in one direction if the applied field is in the same general direction as the film magnetization vector and will shift in the opposite direction if the applied field is in opposition to the film magnetization vector. Accordingly, the permeability versus frequency characteristic will lie on a line 26, as seen in FIGURE 2, if a zero is stored or, in other words, if the field produced by pulsing the line 15 is in the same general direction as the magnetization vector of the thin film device 10. The permeability exhibited by the thin film device 10 to the 500 mc. field may then be represented by a point 27 on the line 26. On the other hand, if a one is stored, or if the field produced by winding 15 is in opposition to the magnetization vector of the film, then the permeability versus frequency characteristic will be defined by a line 28 and the permeability seen by the 500 mc. field will be represented by a point 29. Accordingly, when the winding 15 is driven by a pulse 30 as seen in FIGURE 3*a*, the output of the detector 14 will exhibit a positive pulse 31 of FIGURE 3*b* if a one is stored in the device 10, or will exhibit a negative-going pulse 32, as seen in FIGURE 3*c*, if a zero is stored. It is immediately recognized that a UHF field slightly greater than the 600 mc. value may be used instead of slightly less than this value, the basic idea merely being analogous to slope detection.

If the magnetic field provided by the winding 15 is kept below a critical level or approximately one-half the field necessary to switch the magnetization of the thin film device 10, then the pulse 30 applied to the winding 15 will not switch the device from one stable position to the other. In other words, the pulse 30 will not destroy the memorized bit of information if the magnitude is low enough. Also, it should be noted that the orientation of the winding 15 about the transmission line is such that the field provided by the winding has no component in parallel with the magnetic vector of the UHF energy, and therefore there is no output at the detector 14 due to the pulse 30 alone, but only due to the change in permeability in the disc 10 caused by the pulse 30.

The nondestructive readout technique described thus far illustrates only a single bit memory. With reference now to FIGURE 4, a large number of the thin film devices may be arranged in a matrix, a three word, three bit-per-word, random access, word-organized memory device being shown. The embodiment of FIGURE 4 also incorporates a selective write-in arrangement. A flat, conductive, nonmagnetic plate 35 is utilized as one conductor of a plurality of parallel transmission lines, while a set of three thin, conductive, nonmagnetic strips 36–38 are provided as the other conductors of the transmission lines. Suitable coaxial-to-stripline input couplings 39–41 are provided for each of the transmission lines or conductors 36–38, each of the couplings 39–41 being connected to a source 42 of UHF energy of the appropriate frequency by means described below. Since it would ordinarily be desired to read out the memory bits in parallel, all of the lines 36–38 would be simultaneously and continuously energized by the UHF input. The opposite end of each of the conductors 36–39 is connected to one of a plurality of output couplings 43–45, which are in turn connected to output devices 46–48 which may include crystal diode detectors and register or indicating means. A set of three sense or readout windings 50–52 are shown separately encircling the plate 35 at spaced parallel positions. The sense windings 50–52 are selectively energized with readout signals, such as the pulse 30 of FIGURE 3*a* by readout and write-in pulse generators 53–55. Beneath the intersection of each of the strips 36–38 and each of the windings 50–52 is positioned one of a plurality of thin film memory discs 56, each being similar to the device 10 of FIGURE 1. The discs 56 are positioned between the conductors 36–38 and the plate 35 so that they are influenced by the UHF energy and by the field provided by the windings 50–52. Readout of a given word may be accomplished by energizing the appropriate one of the word or sense windings 50–52 by one of the sources 53–55, the digit lines or strips 36–38 being continuously energized. Readout of a particular bit is of course possible by energizing only one of the digit lines 36–38 with UHF energy while pulsing the appropriate word line.

The system of FIGURE 4 also includes a write-in scheme using the same strips 36–38 and windings 50–52 as used for readout, except the write-in is by D.-C. pulses, the UHF playing no part. The digit lines or strips 36–38 are driven by write-in pulse generators 57–59, the outputs of which are connected by directional couplers 60–62 to the input couplings 39–41. The UHF source 42 is connected by coaxial line to the other inputs of the directional couplers 60–62, the purpose of the latter being to isolate the source 42 from the D.-C. write-in voltages. The write-in technique may be somewhat similar to that described by E. M. Bradley in an article, "A Computer Storage Matrix Using Ferromagnetic Thin Films," Journal of the British I.R.E., October 1960, pp. 765–784. However, in the present scheme each of the thin film devices 56 is oriented such that the easy axis makes an angle of about 11° with one of the digit lines 36–38. This angle is not critical, and may be any value less than 45°, although a small angle provides a better output signal. The write-in mechanism may best be explained by considering a particular disc 56 disposed beneath the intersection of the line 36 and the winding 50, as seen in FIGURE 5. The easy axis of the disc 56 lies along a dotted line 64, the right-hand direction being designated as "one" and left hand as "zero." The word line 50 is first energized by the source 53 with a pulse 65 as seen in FIGURE 6*a*, producing a field $H_{w_1}$, illustrated by an arrow in FIGURE 5. This will unconditionally set all of the discs under the line 50 to "1." Subsequently, a pulse 66 of opposite polarity is applied to the winding 50, producing a field $H_{w_2}$. The magnitude of $H_{w_2}$ is insufficient to switch the magnetization to "0," but if a pulse 67 is applied to the digit line 36 at the same time, the critical value may be exceeded and the magnetization switched from "1" to "0." It is noted that the pulse 66 persists after the termination of the pulse 67 so that rotation of the magnetization vector around to the "0" direction will be assured. It is seen that information may be written in one word at a time, all bits in each word line being first set to "1" and then the desired bits being reset to "0."

As explained above, the nondestructive readout of the thin film device provided by this invention is based upon a shift in the frequency of maximum permeability of a ferromagnetic thin film due to an external magnetic field. A more precise relation between the UHF permeability and the external field will now be derived. As previously stated, permalloy films with a thickness of less than about $10^4$ A. generally exhibit the properties of a single magnetic domain having a uniaxial anisotrophy. That is to say, the entire magnetization of the sample prefers to lie parallel to one direction and may be treated as if it were a single vector, M. With reference to FIGURE 7, if a magnetic field H is applied so that it makes an angle $\psi$ with the magnetization vector, a torque is exerted on M. M will then tend to rotate toward H, but owing to the gyroscopic properties of M, it will not align itself with the field but will precess in a cone about the direction of the magnetic field which is inside of the sample. The frequency of this precession is known at the Larmor precession frequency and is directly proportional to the internal field of the sample.

The internal field in a thin film is different from an external applied field. This difference arises from the presence of demagnetizing fields and the anisotropy field. A film having a uniaxial anisotropy may be thought of as possessing an anisotropy field ($H_K$) along one direction, which tends to keep the magnetization parallel to it. This direction is known as the easy axis. Thus in the presence of no external field, the internal field will be $H_K$. This gives rise to a precession of the magnetization even in the absence of any applied field. It may be established that the frequency of this precession can be expressed $$\omega_K = \gamma\sqrt{4\pi M H_K} \quad (1)$$

In Equation 1, $\omega_K$ is the Larmor precession frequency (approximately 600 mc.) and $\gamma$ is the gyromagnetic ratio (2.8 mc./gauss). If we apply an external magnetic field parallel to the easy axis in the direction of M, the external field will add to the anisotropy field. This yields a new Larmor precession frequency given by the expression $$\omega = \gamma\sqrt{4\pi M(H_K+H)} = \omega_K\sqrt{1+H/H_K} \quad (2)$$

where H is the applied field. If the field is applied parallel to the easy axis but in the opposite direction of M, the external field subtracts from the anisotropy field and the expression for the Larmor precession frequency becomes $$\omega = \gamma\sqrt{4\pi M(H_K-H)} = \omega_K\sqrt{1-H/H_K} \quad (3)$$

It must be noted at this point that Equation 3 is only valid as long as H is less than the critical field $H_c$ which will cause the magnetization to change direction. If this critical field is exceeded, the magnetization will switch from its original position by domain wall movement until it points along the direction of the applied field. Equation 2 will then apply. A graph of $\omega/\omega_K$ as a function of $H/H_K$ for the two cases is shown in FIGURE 8. This analysis has been given only for the case with the field parallel to the easy axis. In actual practice, the same type of behavior exists when the field is applied at an angle to the easy axis.

It can be further established that the precession frequency of the magnetization vector affects the UHF permeability exhibited by a thin film. If a UHF magnetic field $H_{uhf}$ is placed at about right angles to the precessing vector as seen in FIGURE 7, this field can apply a torque to the magnetic vector M. The maximum energy can be transferred from the UHF field to the magnetization vector when the frequency of the UHF field is equal to the precession frequency of the magnetization vector. This condition is known as resonance.

The permeability of a magnetic sample is a complex quantity and is usually written in the form $\mu = \mu_1 - j\mu_2$. The real part $\mu_1$ is a measure of the frequency dispersion and the imaginary part $\mu_2$ is a measure of the power absorbed by the sample. The imaginary component is the part in which we are interested. In Physical Review, June 1, 1950, p. 572, N. Bloembergen expressed this imaginary component as $$\mu_2 = \frac{(\gamma 4\pi M)^2\alpha}{(\omega_0^2-\omega^2)^2+\alpha^2} \quad (4)$$

Where $\omega_0$ is the frequency of the UHF wave, $\omega$ is the Larmor precession frequency and $\alpha$ is a damping term. Thus it is seen that the permeability is a maximum when $\omega=\omega_0$ and decreases as $\omega$ departs therefrom in either direction. It can be established that the real power delivered to the load or the detector 14, assuming that the input 13 is of constant frequency and amplitude, and that the line 12 is essentially lossless except for the device 10, is dependent upon the permeability of the thin film, which is of course related to the external field provided by the winding 15 and upon the direction of magnetization within the film.

While this invention has been described with reference to specific embodiments, this description is not meant to be construed in a limiting sense. It is of course understood that various modifications may be made by persons skilled in the art, and so it is contemplated that the appended claims will cover any such modifications as fall within the true scope of the invention.

What is claimed is:

1. Apparatus for sensing the direction of magnetization of a ferromagnetic thin film exhibiting uniaxial anisotropy comprising means for generating a UHF electromagnetic field in the area of said film, means for generating an external magnetic field, of a magnitude less than required to switch the direction of remanent magnetization of the film, in a direction generally parallel to the plane of said thin film, and means for detecting a change in the UHF permeability of said thin film upon said electromagnetic field during the existence of said external magnetic field.

2. Apparatus for sensing the direction of magnetization of a ferromagnetic thin film comprising means for providing an electromagnetic field having a frequency slightly different than the frequency of maximum permeability of said thin film, said thin film being positioned within said electromagnetic field in a plane substantially parallel to the magnetic vector thereof, means for providing a magnetic field in a direction substantially parallel to the plane of said thin film and substantially perpendicular to the magnetic vector of said electromagnetic field, and means responsive to the magnitude of said electromagnetic field for detecting the variation in the permeability of said thin film due to said magnetic field.

3. Nondestructive readout apparatus for a ferromagnetic thin film memory device comprising a transmission line, a source of signals having a frequency near the frequency of maximum permeability of said device connected to one end of said line, said device being positioned within said line in a plane generally parallel to the magnetic vector of said signals, a winding surrounding said device for providing a magnetic field in a direction parallel to the plane of said device and generally perpendicular to said magnetic vector, means for selectively energizing said winding with pulses having a magnitude less than required to switch the direction of magnetization of said device, and detecting means responsive to said signals connected to the other end of said line.

4. Apparatus for sensing the direction of magnetization of a thin film memory disc comprising a stripline, an ultra-high frequency source connected to one end of said stripline, said source having a frequency near the frequency of maximum permeability of said memory disc, detecting means connected to the other end of said stripline, said detecting means being responsive to said ultra-high frequency and adapted to produce an output signal related to the magnitude thereof, said memory disc being positioned within said stripline intermediate said ends, a winding encircling said stripline adjacent said memory disc, and means for momentarily energizing said winding.

5. A multi-bit memory having nondestructive readout comprising a flat conductive member, a plurality of flat conductive strips positioned in a generally parallel spaced relationship adjacent one surface of said member, a plurality of separate windings surrounding said member and said strips in a generally parallel spaced relationship to one another, a plurality of ferromagnetic thin film memory elements, one of said elements being positioned adjacent the intersection of each of said windings and each of said strips, said memory elements being interposed between said strips and said member, means for applying an ultra-high frequency energy to one end of each of said conductive strips to produce a high frequency electromagnetic field adjacent said thin film memory elements, means for selectively energizing each of said windings to provide an external magnetic field, of a magnitude less than that required to switch the magnetization vector, in a direction generally parallel to the plane of the thin film memory elements and generally parallel to the axis of anisotropy of said memory elements and means for detecting the ultra-high frequency at the other end of each of said conductive strips.

6. Ferromagnetic thin film memory apparatus having write-in and nondestructive readout features comprising a flat conductive member, a plurality of flat conductive strips positioned in a generally parallel spaced relationship adjacent one surface of said member, a plurality of separate windings surrounding said member and said strips in a generally parallel spaced relationship, a plurality of ferromagnetic thin film memory elements, one of said elements being positioned adjacent the intersection of each of said windings and each of said strips, said elements being interposed between said strips and said member, the easy axis of each of said elements being oriented at an acute angle with said strips and said windings, means for coupling ultra-high frequency energy to one end of each of said strips, said energy having a frequency near the frequency of maximum permeability of said elements, pulse generating means for selectively applying pulses to said strips and said windings for establishing and sensing the direction of magnetization in said elements, and means for detecting said energy at the other end of each of said strips.

7. Apparatus according to claim 6 wherein said pulse generating means is adapted to first apply a large pulse to one of said windings in order to set the direction of magnetization in each of the elements thereunder, said pulse generating means being adapted to thereafter switch the direction of magnetization in selected elements under said winding by applying pulses in coincidence to said winding and to said strips which intersect said winding over said selected elements, each of said later pulses being individually smaller in magnitude than necessary to switch the direction of magnetization of said elements.

8. Apparatus for sensing the direction of magnetization of a ferromagnetic thin film device comprising:

(a) means for applying an external magnetic field less than that required to cause the magnetization vector to switch, adjacent said thin film device in a direction generally parallel to the plane of said thin film device, and (b) means including a source of UHF electromagnetic energy, coupled to said thin film device for detecting a change in the UHF permeability of said thin film device.

9. Electrical apparatus comprising:

(a) a ferromagnetic thin film device exhibiting uniaxial anisotropy, (b) means for applying an external magnetic field, at a magnetude less than that required to switch the magnetization vector, in a direction generally parallel to the plane of said thin film and generally parallel to the easy axis of said anisotropy, (c) means for producing an ultra high frequency electromagnetic field adjacent said thin film device, and (d) means for detecting the change in the UHF permeability of said thin film device.

References Cited by the Examiner

UNITED STATES PATENTS

| | | | |
|---|---|---|---|
| 3,071,756 | 1/1963 | Pugh | 340—174 |
| 3,077,586 | 2/1963 | Ford | 340—174 |
| 3,126,529 | 3/1964 | Hempel | 340—174 |
| 3,154,766 | 10/1964 | Bittmann | 340—174 |

FOREIGN PATENTS

| | | |
|---|---|---|
| 1,226,056 | 2/1960 | France. |

OTHER REFERENCES

Publication I: "Thin Film Memory" by Ford, Jr., IBM Technical Disclosure bulletin, vol. 2, No. 5, page 84, February 1960.

BERNARD KONICK, *Primary Examiner.*

IRVIN SRAGOW, *Examiner.*

S. URYNOWICZ, *Assistant Examiner.*